United States Patent [19]

Stager et al.

[11] Patent Number: 5,707,492

[45] Date of Patent: Jan. 13, 1998

[54] METALLIZED PAD POLISHING PROCESS

[75] Inventors: Charles W. Stager; Thomas S. Kobayashi; Joseph E. Page; Mark A. Zaleski; Paul M. Winebarger, all of Austin, Tex.

[73] Assignee: Motorola, Inc., Schaumburg, Ill.

[21] Appl. No.: 573,990

[22] Filed: Dec. 18, 1995

[51] Int. Cl.⁶ ................................................. B24B 1/00
[52] U.S. Cl. ........................ 156/645.1; 156/636.1; 156/345; 216/88; 451/41; 451/287; 51/295
[58] Field of Search .......................... 156/636.1, 645.1, 156/345 LP; 216/88, 89; 252/79.1; 451/287, 41, 285; 51/295, 309

[56] References Cited

U.S. PATENT DOCUMENTS

| | | | |
|---|---|---|---|
| 3,715,842 | 2/1973 | Tredinnick et al. | 51/308 |
| 3,916,584 | 11/1975 | Howard et al. | 51/309 |
| 4,022,625 | 5/1977 | Shelton | 51/309 |
| 4,244,775 | 1/1981 | D'Asaro | 156/636.1 |
| 4,466,218 | 8/1984 | Ottman et al. | 51/395 |
| 4,910,155 | 3/1990 | Cote et al. | 437/8 |
| 4,951,427 | 8/1990 | St. Pierre | 51/295 |
| 4,959,113 | 9/1990 | Roberts | 216/89 |
| 5,177,908 | 1/1993 | Tuttle | 451/287 |
| 5,192,339 | 3/1993 | Hasegawa et al. | 51/309 |
| 5,216,843 | 6/1993 | Breivogel et al. | 451/287 |
| 5,264,010 | 11/1993 | Brancaleoni et al. | 51/309 |
| 5,314,512 | 5/1994 | Sexton | 51/293 |
| 5,336,280 | 8/1994 | Dubots et al. | 51/309 |
| 5,525,135 | 6/1996 | Moltgen et al. | 51/309 |
| 5,525,191 | 6/1996 | Maniar et al. | 156/636.1 |

FOREIGN PATENT DOCUMENTS 2 267 389  1/1993  United Kingdom .......... H01L 21/304

OTHER PUBLICATIONS

Steigerwald, J. M. et al., "Effect of Copper Ions in the Slurry on the Chemical–Mechanical Polish Rate of Titanium", J. Electrochem. Soc., vol. 141, No. 12, Dec. 1994, pp. 3512–3516.

Perry et al, Chemical Engineers Handbook, McGraw Hill Book Co., 5th ed., pp. 23–51, 1973.

Primary Examiner—R. Bruce Breneman
Assistant Examiner—Anita Alanko

[57] ABSTRACT

A chemical-mechanical-polishing (CMP) process in which a metal interconnect material (47) is polished to form a metal plug (48) includes the application of titanium to the surface of a polishing pad (14) of a polishing apparatus (10). Titanium metal is applied to the surface of the polishing pad (14) by either abrasively applying titanium by use of a titanium block (32) attached to a rotating disk (26), or by a titanium body (23, 25) integrated with a carrier ring (23). Alternatively, titanium can be applied by impregnating a felt layer (52) with titanium particles (56), or by adding titanium directly to the polishing slurry (50).

8 Claims, 2 Drawing Sheets

METALLIZED PAD POLISHING PROCESS

FIELD OF THE INVENTION

This invention relates, in general, to a method for fabricating a semiconductor device, and more particularly, to a process for polish planarizing a metal layer on a semiconductor substrate.

BACKGROUND OF THE INVENTION

As semiconductor devices have continued to increase in complexity, there is a continuing trend to fabricate devices having multiple layers of metal interconnects. The multiple interconnect layers are separated by dielectric layers that electrically isolate the interconnect layers from each other. The dielectric layers contain openings, known as vias, through which the overlying metal interconnect layers are electrically coupled together. The metallized via has become an important component of multi-level metal semiconductor devices.

The process for fabricating a metallized via typically includes depositing a refractory metal, such as tungsten, into the via opening completely filling the opening and also overlying the dielectric layer. Then, a planarization process is performed to remove portions of the refractory metal layer overlying the dielectric layer leaving a metallized plug in the via. Typically, a polish planarization process is used to remove refractory metal from the semiconductor substrate during the fabrication of a metallized plug. The polishing process abrasively removes the refractory metal from the surface of the semiconductor substrate leaving a smooth, flat, continuous surface.

In one polishing technique, the metal surface of the semiconductor substrate is brought into contact with a rotating polishing pad in the presence of an abrasive slurry. A portion of the refractory metal layer is abrasively removed by the mechanical action of the polishing pad and the chemical action of the slurry. This process is known as chemical-mechanical-polishing (CMP). The slurry serves to lubricate the surface of the polishing pad and contains a fill material, such as alumina ($Al_2O_3$), to provide additional abrasive force. Chemicals are added to the slurry to adjust the pH and to chemically etch the surface layer to be polished. See, for example, U.S. Pat. No. 4,910,155 to W. Cote.

A common requirement of all CMP processes is that the semiconductor material by removed from the substrate at a high rate. Also, to insure that reliable via plugs are fabricated, the refractory metal layer overlying the dielectric layer must be uniformly removed. Rapid and uniform polishing can be difficult because, typically, there is a strong dependence of the polish removal rate with localized variations in the surface typography of the substrate. Furthermore, in order to be economically advantageous, the polishing process must have a reasonably high throughput in order to offset the high cost of CMP equipment and consumable supplies.

The need for high throughput is especially critical in the fabrication of multi-level metal devices because the CMP process is used several times in the fabrication process. Each layer of metal interconnects must be coupled through a series of vias in the dielectric layer separating the metal interconnect layers. If the throughput is not maintained at a high level, many polishing systems will be necessary to achieve a high total throughput for a given fabrication line. Moreover, the relatively large size of polishing systems requires that substantial factory floor space be provided to accommodate the numerous polishing systems necessary for high total throughput. Accordingly, improvements are necessary in the CMP process to increase the polishing rate while maintaining high polishing uniformity.

SUMMARY OF THE INVENTION

In practicing the present invention there is provided a metallized pad polishing process for polished planarizing a semiconductor substrate. A high polish rate is maintained during a metal polishing process by the application of titanium metal to the polishing pad of the polishing apparatus. In one embodiment of the invention, a semiconductor substrate having a surface to be polished is provided. Titanium is applied to the polishing surface of a polished pad and the semiconductor substrate is polished by abrasively contacting the polishing surface to the surface of the semiconductor substrate. The application of titanium to the polishing surface insures a high polishing rate and good polishing uniformity in a CMP process.

Figure 1:
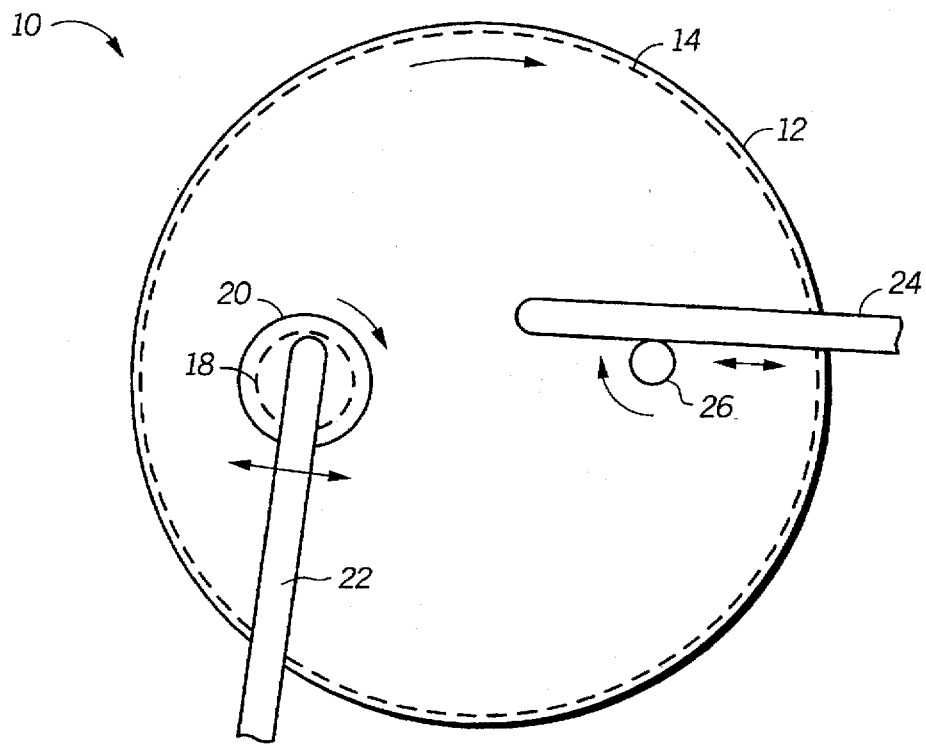
FIG. 1 illustrates a top view of a exemplary polishing apparatus for practicing the present invention.

It will be appreciated that for simplicity and clarity of illustration, elements shown in the FIGURES have not necessarily been drawn to scale. For example, the dimensions of some of the elements are exaggerated relative to each other. Further, where considered appropriate, reference numerals have been repeated among the FIGURES to indicate corresponding elements.

DETAILED DESCRIPTION OF PREFERRED EMBODIMENTS

The present invention provides a process for polished planarizing semiconductor devices in which a high polish rate is maintained by abrasively applying titanium metal to the polishing pad of a polishing apparatus. By continuously applying titanium to the surface of the polishing pad, while simultaneously polishing semiconductor substrates, a high polish removal rate of a metal layer on each substrate is maintained. Additionally, the application of a titanium layer to the surface of the polishing pad improves the polishing uniformity when polish planarizing a metal layer to form a refractory metal via plug. The increase in polishing rate and uniformity obtained by the process of the present invention advantageously increases the throughput in a CMP process. Furthermore, the process of the present invention can be practiced with many different types of polishing systems including rotational, oscillating, and belt-drive type polishing systems.

Shown in FIG. 1, in top view, is a portion of a rotational-type polishing system 10. Polishing system 10 includes a platen 12 that rotates in a clockwise direction as indicated by the arrow shown in FIG. 1. A polishing pad 14 overlies platen 12 and provides an abrasive surface for the removal of material layers brought into contact with polishing pad 14. A slurry (not shown) is dispensed onto the surface of polishing pad 14 to assist in the abrasive removal of material layers from the semiconductor substrates. A semiconductor substrate 18 is attached to a support wheel 20 that rotates in the same clockwise direction as platen 12. Support wheel 20 is suspended from a movable support arm 22 by a shaft (not shown) contained within support arm 22. Materials layers are removed from the surface of semiconductor substrate 18 by a frictional force created by the counter-rotation of support wheel 20 against platen 12. The polishing slurry is an abrasive lubricant that aids in the polishing process and is typically a mixture of alumina particles ($Al_2O_3$) or silica suspended in an aqueous chemical solution.

In accordance with the invention, a conditioner arm 24 is cantilevered over polishing pad 14 and supports a rotating disk 26. Rotating disk 26 rotates in the same clockwise direction as platen 12, as indicated by the arrow shown in FIG. 1. Rotating disk 26 is attached to conditioner arm 24 by a motor-driven shaft (not shown), which is, in turn, attached to a screw-driven carriage (not shown) housed inside conditioner arm 24. Rotating disk 26 is reciprocally moved along the longitudinal axis of conditioner arm 24 by the screw-driven carriage. The reciprocal motion of rotating disk 26 along conditioner arm 24 permits rotating disk 26 to cover the entire radial distance of polishing pad 24 overlying platen 12, while platen 12 rotates in a clockwise direction.

Figure 2A:
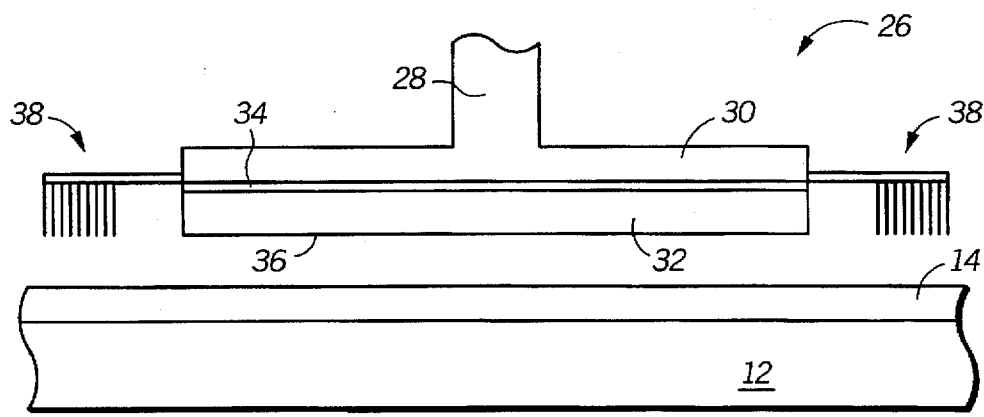
FIGS. 2a–2c illustrate, in cross-section, various embodiments for the application of titanium to the polishing pad of a polishing apparatus.

A cross sectional view of rotating disk 26 together with a portion of platen 12 and polishing pad 14, is shown in FIG. 2a. Rotating disk 26 includes a flexible shaft 28 attached to a mounting surface 30. A titanium block 32 is adhesively attached to mounting surface 30 by an adhesive layer 34. Titanium block 32 has a contact surface 36 that makes mechanical contact with polish pad 14 during the CMP process. Titanium from titanium block 32 is transferred to polishing pad 14 by the frictional force created when the counter-rotating block and polishing pad are brought together.

Although titanium block 32 is shown having a smooth continuous bottom surface, the deposition of titanium onto polishing pad 14 can be enhanced by corrugating contact surface 36 of titanium block 32. Further, one or more brushes 38 can be attached to mounting surface 30, as illustrated in FIG. 2a. While the brush illustrated in FIG. 2a denotes a wire brush, other types of brushes can be used, such as a diamond conditioner, a grit impregnated pad, and the like.

Figure 2B:
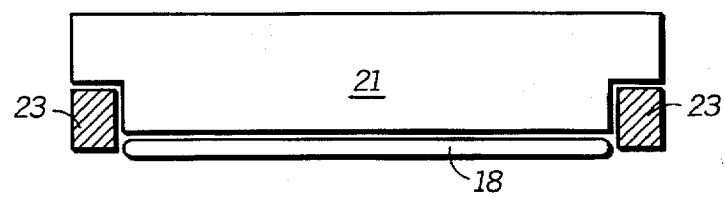
Figure 2C:
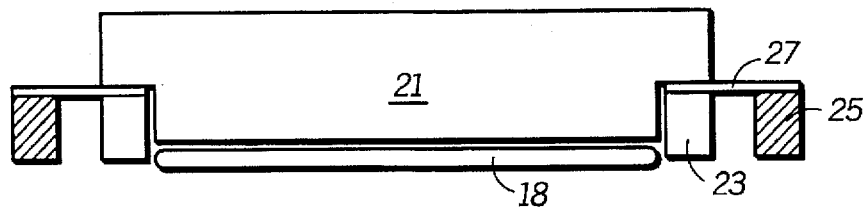

FIGS. 2b and 2c, illustrate other mechanical arrangements for conditioning polishing pad 14 with titanium. In FIG. 2b, a wafer carrier 21 is attached to support wheel 20 and holds semiconductor substrate 18 be means of a retaining ring 23. Retaining ring 23 can be a ring of solid titanium, or alternatively, retaining ring 23 can be a metal ring having a titanium insert. In either case, when support wheel 20 brings wafer carrier 21 and semiconductor substrate 18 into contact with polishing pad 14, titanium will be transferred to polishing pad 14 by frictional force.

Yet another mechanical arrangement for transferring titanium to polishing pad 14 is illustrated in FIG. 2c. A titanium body 25 is attached to carrier ring 23 by attachment member 27. Titanium body 25 can be either a continuous ring surrounding the perimeter of wafer carrier 21, or it can be segmented and attached at various points on the perimeter of wafer carrier 21 by attachment member 27.

It is important to note that the titanium transfer methods using the mechanical arrangements shown in FIGS. 2b and 2c can reduce the mechanical complexity required to condition polishing wheel 14 with titanium. Since the apparatus for securing a titanium body is integrated with the polishing wheel, additional mechanical devices are not necessary to bring a titanium source into contact with polishing wheel 14.

Those skilled in the art will appreciate that the process of the present invention can be carried out with a variety of different types of CMP systems. For example, rotating disk 26 and conditioner arm 24 can be coupled to a belt-type polishing system in which the polishing pad is continuously moved past semiconductor substrates in a linear direction. Also, the process of the invention can be carried out with a single wafer CMP system. Furthermore, the present invention contemplates the application of titanium to a polishing pad by mechanical mechanisms other than that illustrated in FIGS. 1 and 2. For example, titanium can be applied to the surface of a polishing pad by a continuous oscillatory or belt-drive mechanism. Accordingly, all such variations in polishing system design and mechanical arrangements for applying titanium to a polishing pad are within the scope of the present invention.

Figure 3:
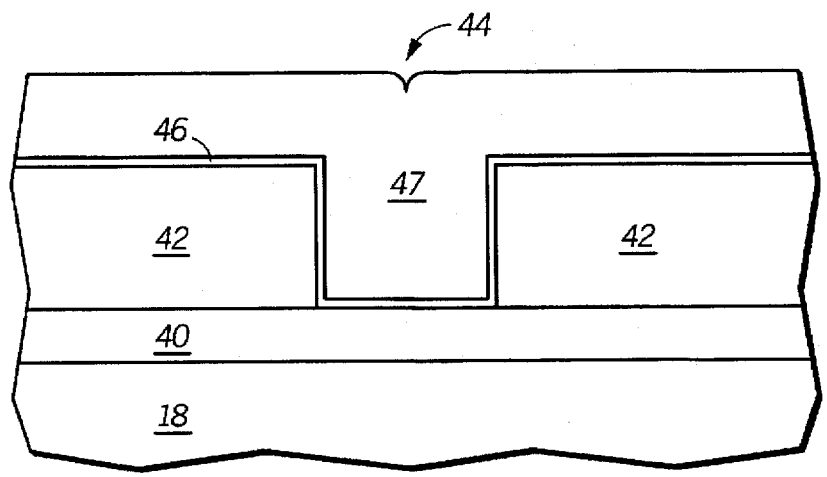
FIGS. 3 and 4 illustrate, in cross-section, process steps for polishing a refractory metal layer in accordance with the invention.
Figure 4:
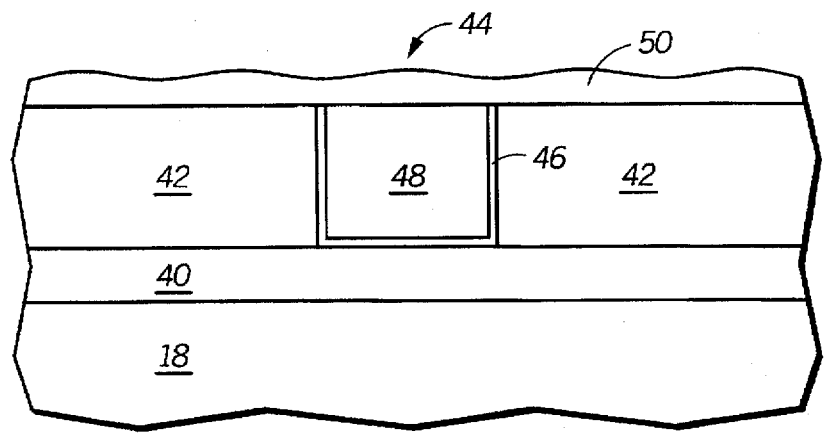

FIGS. 3 and 4 illustrate, in cross-section, processing steps by which a refractory metal layer on a semiconductor substrate 18 is polished in accordance with the present invention. Shown in FIG. 3 is a portion of semiconductor substrate 18 during the fabrication of a metal plug and at a stage prior to CMP. A device layer 40 overlies semiconductor substrate 18 and a dielectric layer 42 overlies device layer 40. A via opening 44 in dielectric layer 42 exposes a portion of device layer 40 and a glue layer 46 overlies dielectric layer 42 and the exposed portion of device layer 40. Device layer 40 can be a diffused region in a single silicon substrate, or a portion of a metal interconnect having already been patterned to define metal interconnect leads overlying semiconductor substrate 18. Glue layer 46 is usually a bilayer of titanium and titanium nitride. A metal interconnect material 47 overlies glue layer 46 and fills opening 44. Metal interconnect material is typically a refractory metal, such as tungsten, titanium, a tungsten-titanium alloy, or a copper metal, a copper alloy, or the like.

FIG. 4, illustrates, in cross-section, the formation of a metal plug 48 in opening 44. To form metal plug 48, polishing pad 14 is brought into contact with metal interconnect material 47 in the presence of an abrasive slurry 50. In the case where metal interconnect material 47 is tungsten, abrasive slurry 50 includes iron nitrate (Fe ($NO_3)_3$) and aluminum particles suspended in a water based slurry.

To carry out the polishing process, semiconductor substrate 18 is attached to support wheel 20 shown in FIG. 1. Movable support arm 22 lowers support wheel 20 such that metal interconnect material 47 on semiconductor substrate 18 comes into contact with polished pad 14. Then, slurry 50 is dispensed onto polished pad 14 and both polished pad 14 and support wheel 20 are rotated in a clockwise direction. Titanium is continuously deposited onto the surface of polish pad 14 during the polishing operation. Rotating disk 26 is rotated in a counter-clockwise direction and moved back and forth along conditioner arm 24 as shown by the double arrow in FIG. 1. Accordingly, titanium is continuously applied to polishing pad 14 while metal interconnect material 47 is removed from semiconductor substrate 18.

Figure 5:
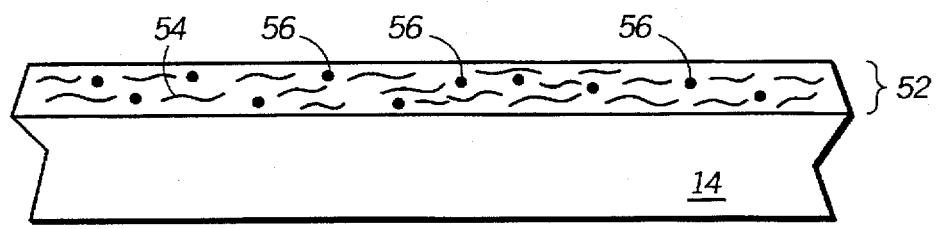
FIG. 5 illustrates, in cross-section, a portion of a polishing pad illustrating the application of titanium in accordance with an alternative embodiment of the invention.

In another embodiment of the invention, titanium metal is interspersed into felt layer 52 of polishing pad 14, as illustrated in FIG. 5. Felt layer 52 is a urethane film having nylon fabric threads 54 dispersed throughout the urethane film. To enhance the polishing rate of metal interconnect material 47, titanium particle 56, shown as solid black dots in FIG. 5, are introduced into the urethane film at the time of manufacturing polishing pad 14. The embodiment of the invention illustrated in FIG. 5 has the advantage of eliminating the need for mechanical apparatus in the application of titanium to polishing pad 14. Furthermore, introducing titanium into the polishing pad itself eliminates the need to replace titanium blocks as they wear out through continuous use during the polishing process.

In yet another embodiment, titanium is added directly to abrasive slurry 50 and is continuously deposited onto polishing pad 14 during a polishing process. The titanium can be added to the slurry as elemental titanium or as titanium compound, such as titanium oxide, or a titanium alloy, or the like. Preferably, sufficient titanium is added to the slurry to yield a concentration of at least 0.01 wt. %. In a more preferred embodiment, sufficient titanium is added to produce a slurry having about 0.01 to about 10 wt %, and most preferably about 0.01 to 0.10 wt. %.

Thus it is apparent that there has been provided, in accordance with the invention, a metallized pad polishing process, which fully meets the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, the fabrication other structures, such as inlaid metal interconnects, can be carried out by process of the invention. It is therefore intended to include within the invention all such variations and modifications as fall within the scope of the appended claims and equivalents thereof.

We claim:

1. A process for fabricating a semiconductor device comprising the steps of:

providing a semiconductor substrate having a surface thereon;

providing a polishing pad having a polishing surface thereon;

providing a block having a titanium surface;

contacting the polishing surface with the titanium surface to apply titanium to the polishing surface; and polishing the surface of the semiconductor substrate by abrasively contacting the polishing surface to the surface of the semiconductor substrate.

2. The process of claim 1, wherein the step of providing a block is further characterized as providing a block having a corrugated titanium surface.

3. A process for fabricating a semiconductor device comprising the steps of:

providing a semiconductor substrate having a metal surface thereon;

providing a polishing pad having a polishing surface thereon;

providing a block having a titanium surface;

abrasively applying titanium to the polishing surface by contacting the polishing pad with the titanium surface of the block; and polishing the metal surface by abrasively contacting the polishing surface to the metal surface.

4. The process of claim 3, wherein the step of providing a metal surface comprises providing a refractory metal surface selected from the group consisting of tungsten, titanium, and copper.

5. The process of claim 3, wherein the step of providing the block is further characterized as providing a carrier ring having a titanium surface, wherein the carrier ring surrounds the semiconductor substrate.

6. The process of claim 3, further comprising the step of providing a carrier ring surrounding the semiconductor substrate, wherein the block is attached to the carrier ring.

7. The process of claim 3, wherein the step of abrasively applying titanium to the polishing surface comprises the steps of:

providing a polishing apparatus having a platen supporting the polishing pad and a movable support arm cantilevered over the polishing pad;

providing a rotatable disk and means for reciprocally moving the rotatable disk along the movable support arm, wherein the block is attached to the rotatable disk; and rotating the block against the polishing pad.

8. The process of claim 7, wherein the step of rotating the block further comprises counter-rotating the platen.

* * * * *